United States Patent [19]

Hohnl

[11] Patent Number: 5,189,870
[45] Date of Patent: Mar. 2, 1993

[54] MOWER DISCHARGE DUCT GUARD
[75] Inventor: Gary D. Hohnl, Slinger, Wis.
[73] Assignee: Deere & Company, Moline, Ill.
[21] Appl. No.: 880,124
[22] Filed: May 7, 1992
[51] Int. Cl.$^5$ .................. A01D 34/70; A01D 75/20
[52] U.S. Cl. .................................. 56/320.2; 56/16.6
[58] Field of Search .................. 56/13.3, 13.4, 16.6, 56/202, 205, 320.1, 320.2, DIG. 20, DIG. 24

[56] References Cited

U.S. PATENT DOCUMENTS

| 4,244,160 | 1/1981 | Carolan | 56/10.5 |
| 4,433,532 | 2/1984 | McCunn | 56/320.2 |
| 4,693,063 | 9/1987 | Hoepfner et al. | 56/16.6 |
| 4,700,534 | 10/1987 | Reilly | 56/13.3 |
| 4,723,398 | 2/1988 | Flenniken et al. | 56/16.6 |
| 4,726,177 | 2/1988 | McGoughy | 56/202 |
| 4,726,178 | 2/1988 | Mallaney et al. | 56/320.2 |
| 4,735,037 | 4/1988 | Benter | 56/13.3 |

Primary Examiner—David J. Bagnell

[57] ABSTRACT

A swingable cover is provided for the discharge opening of the auxiliary blower which assists movement of material from a mower deck to the collector system. The cover is biased towards a closed position to cover the outlet leading from the blower impeller when the outlet duct is uncoupled from the discharge duct leading to the collector system. The cover is preferably made of a plastic material and includes first and second latching means to hold it respectively in its coupled or uncoupled positions.

11 Claims, 3 Drawing Sheets

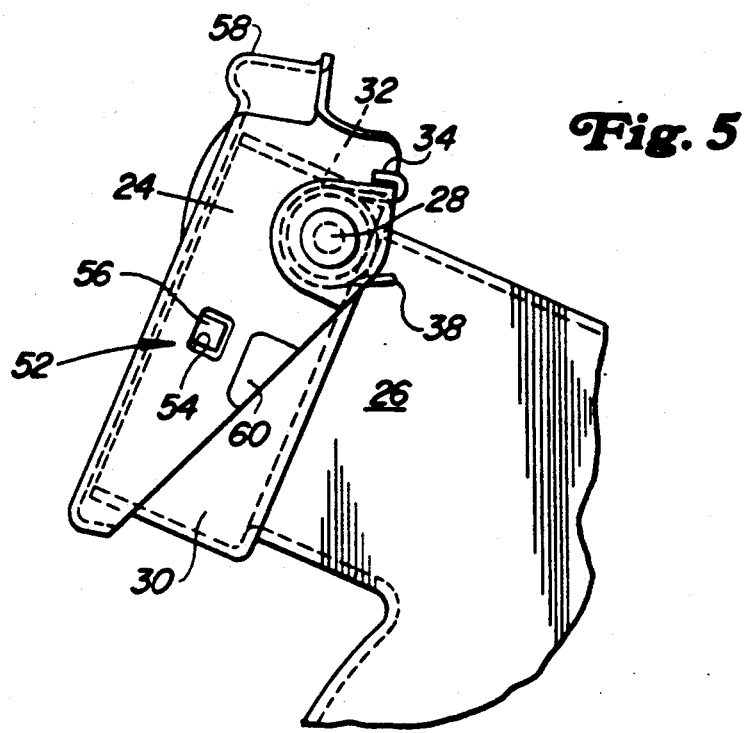
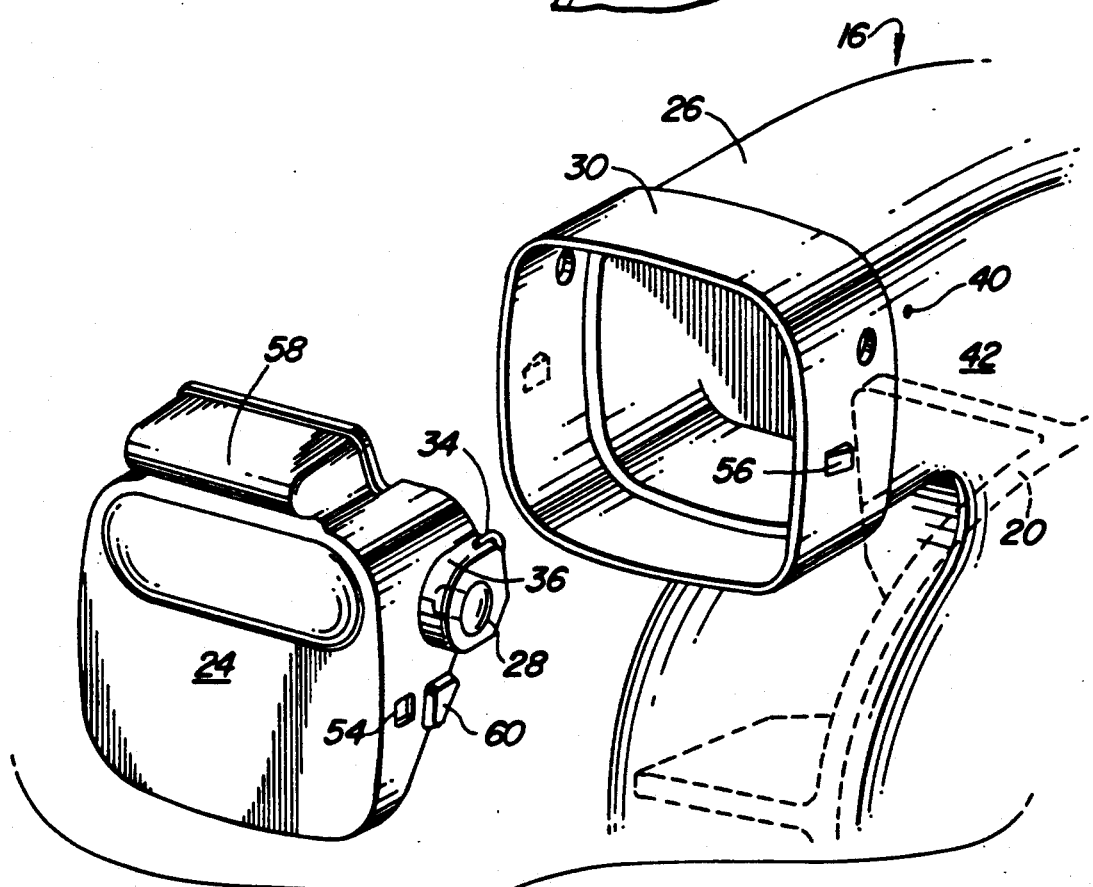

MOWER DISCHARGE DUCT GUARD

BACKGROUND OF THE INVENTION

1. Field of the Invention

The present invention relates to mowers used for cutting lawns and more specifically to mower decks equipped with blower assists that are interconnected to a grass collector by a chute.

2. Description of the Prior Art

Mower decks, such as those carried by a lawn and garden tractor, are commonly equipped with a chute or duct leading to a grass collection system that is in turn carried or pulled by the vehicle. Often times the cut material is propelled through the duct by an auxiliary blower to assure the desired flow of material to the collection system and enhance the pick up of grass and other materials.

When the duct or blower becomes clogged, the operator must physically remove the material. To do this, he must uncouple the duct from the blower housing and check both for obstructions. Since the vehicle, mower, and auxiliary blower will all shut down as the operator dismounts the tractor, due to the standard automatic seat kill switch, uncoupling of the duct and removal of the material clogging it or the blower should proceed safely.

However, the operator must remount the vehicle and restart the vehicle, mower and blower to determine whether the blockage has been eliminated. If he does not reconnect the duct, he and bystanders may be exposed to the risk of being hit by objects thrown from the blower as it is restarted.

It would, therefore, be desirable to provide a ductworkblower structure that minimizes the likelihood that the operator or bystanders would be exposed to objects propelled by the blower impeller when it is disconnected.

SUMMARY OF THE INVENTION

It is, therefore, an object or provide a guard or cover which will close the opening leading from the blower when it is uncoupled, to prevent objects from being thrown out. Specifically, it is an object to provide a cover or guard over the blower outlet, adjacent the impeller. The cover should be fixedly mounted to the blower outlet and easily removed.

The guard or cover subject of the present invention is swingably mounted to move between a position above the blower outlet to allow the grass conveying duct and blower duct to be coupled for use and swing to a position covering the blower duct outlet when they are uncoupled. Since the cover is biased towards its closed position, it automatically closes the impeller duct outlet if not physically held in its open position.

The cover or guard structure is further provided with latching means to retain it in its closed position, as well as latching means that serves to couple it to the conveyor duct and to secure the blower outlet and duct together. At its rear portion, the cover includes a handle to assist in opening it and gaining access to the blower housing for maintenance purposes.

The preferred cover is composed of a plastic-type material to reduce manufacturing costs, enhance cover life and inherently provide the biasing force to assist the latching functions.

BRIEF DESCRIPTION OF THE DRAWINGS

FIG. 5 illustrates in side view of the cover in its close position when the ducts are uncoupled.

FIG. 6 is an elevated and exploded perspective of the cover and its mounting with the blower housing.

DESCRIPTION OF THE PREFERRED EMBODIMENT

Figure 1:
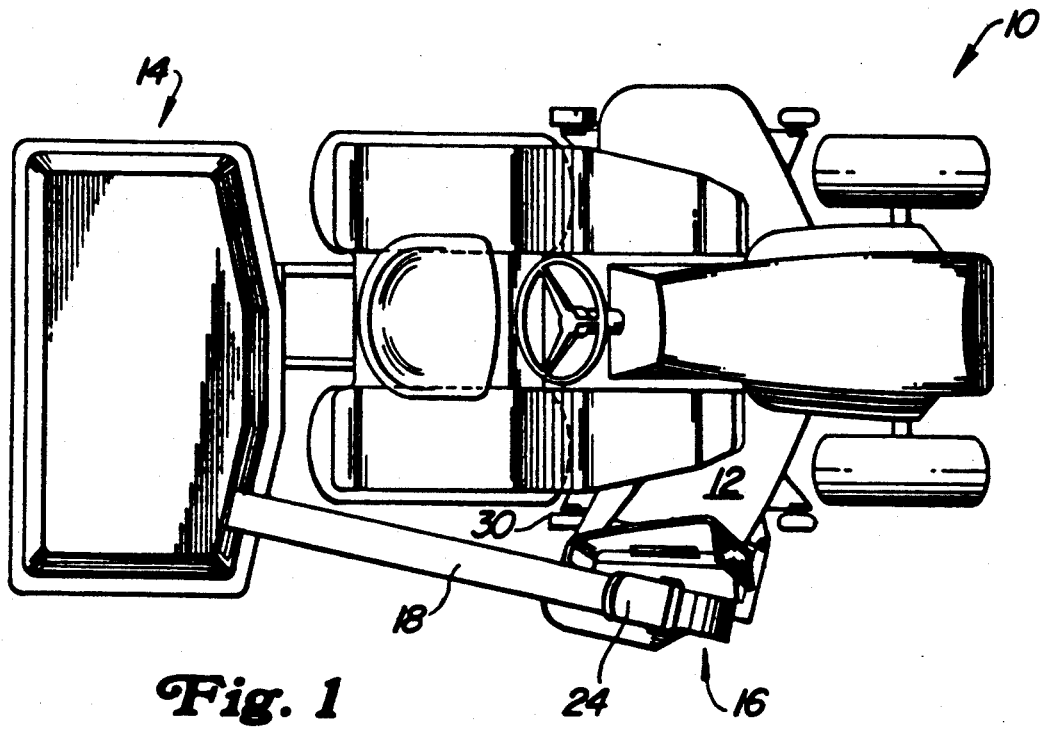
FIG. 1 is a plan view of a vehicle equipped with a mower deck, collection system, grass conveyor duct extending between an auxiliary blower and the collection system, with the blower housing including the guard subject of the present invention.

Looking now to FIG. 1, there is illustrated in plan view a vehicle 10 such as a lawn and garden tractor which carries therebeneath a mower deck designated 12. To the rear of the vehicle 10 is mounted a grass collector 14 and extending between the grass collector 14 and an auxiliary blower 16 mounted at the one side of the mower deck 12 is a collector or conveyor duct 18.

Figure 2:
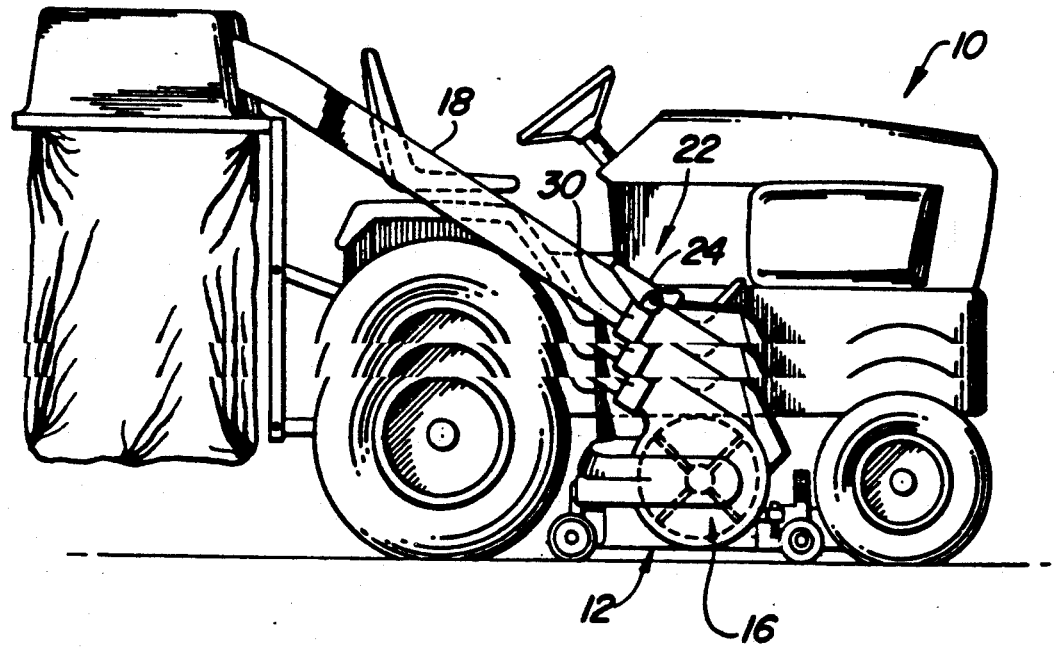
FIG. 2 is a side view of the structures illustrated in FIG. 1.

Looking now to FIG. 2, there is illustrated in side view the structure seen in FIG. 1 and more specifically the blower structure 16 at the lower end of the collector duct 18 and in phantom its impeller 20.

The blower structure 16 is releasably coupled to the conveyor duct 18 which in turn is telescopically coupled with the grass collection structure 14. A guard means 22 including a cover 24 is mounted to the blower outlet 26 about laterally extending pivot pins 28 which are carried on each side of the sleeve 30 covering the duct or outlet at the top of the blower 16.

Looking now to FIGS. 3, 4, 5 and 6, there is illustrated in greater detail the cover means 22 and the two grass conveyor sections 18 and 26 it spans.

Figure 3:
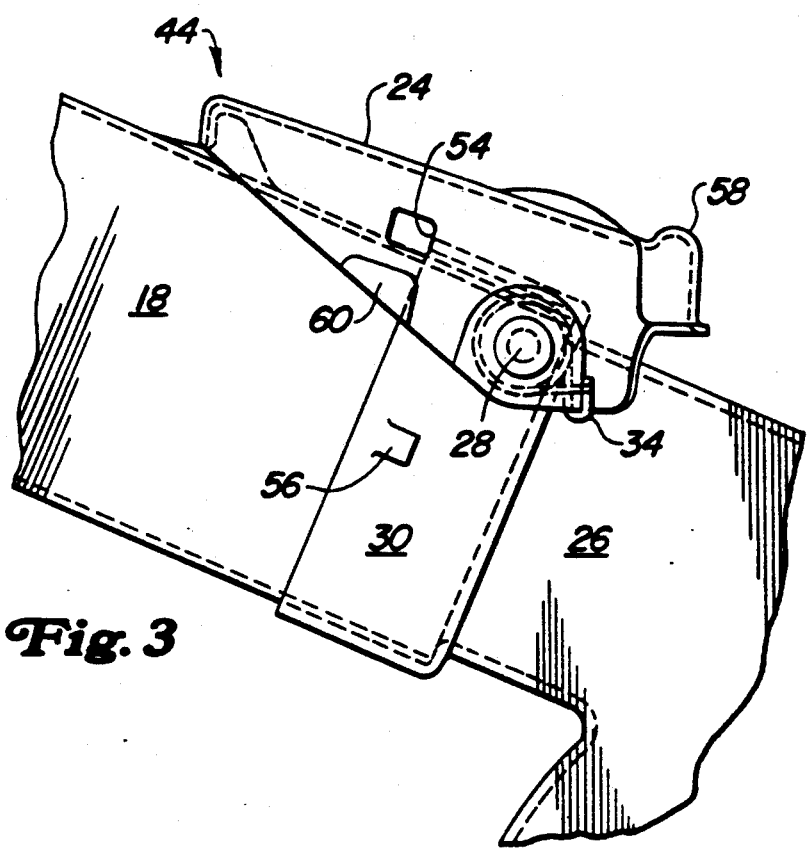
FIG. 3 is an enlarged side schematic view of the cover or guard in its latched position with the conveyor duct.

FIG. 3 illustrates the cover 24 in its closed position. A pair of torsion springs 32 serve to bias the cover downwardly. Since a spring 32 is provided on each side of the cover 24 in essentially identical but mirror image arrangement, only the near spring will be discussed. The spring 32 surrounds the pivot stubs 28 about which the cover 24 is swingably mounted and has its one end 34 resting on the pivot housing ledge 36 with its other end 38 received in the opening 40 of the vertical wall 42 of the blower outlet 26 (see FIG. 6). The cover 24 and conveyor duct 18 are provided with a first latching means 44 for securing the conveyor section 18 to the blower section 26 when they are joined as illustrated in FIG. 3. This latching means or mechanism 44 includes a first upstanding knob 46 with a generally vertical mating surface 48 that has a negative angle of inclination to engage and abut the overhanging lip 50 carried along the one edge of the cover 24. The lip of the cover 24 similarly has a negative angle and, since it is preferably made of a plastic-type material, is easily deflected to permit it to slide out and over the knob 46 and seat thereon. Through this latching mechanism 44, the second or conveyor duct section 18 can be securely held in its joined position in the sleeve 30 carried on the first or blower outlet section 26.

The cover 24 is preferably rectangularly-shaped, as are the conveyor and outlet ducts 18 and 26 and includes a second latching means 52 for holding it in its downwardly swung position illustrated in FIG. 5. This second latching means 52 includes the openings or recesses 54 on either side of the four-sided cover 26, which are adapted to seat onto the protruding ramps 56 that are molded into the blower housing sleeve 30, one such ramp 56 being carried preferably on each of the lateral sides of the sleeve 30.

For moving the cover or guard 24 between the positions illustrated in FIG. 5 and FIG. 3, a handle 58 is provided for the operator to press at the rearward edge. As the cover 24 swings up (from the position illustrated in FIG. 3 to that illustrated in FIG. 4), its lip or leading edge 50 raises off the ramp 46. Accordingly, the first latching means 44 will be disengaged as the lip 50 of the cover 24 slips from the knob 46 carried on the conveyor duct 18 to allow uncoupling of the conveyor duct 18 from the blower duct 26. The torsion springs 32 serves to bias the cover 24 downwardly after the conveyor section 18 had been removed, as illustrated in FIG. 5. In this manner, access to the impeller 20 of the auxiliary blower 16 which is recesses just slightly within the blower duct 26 (see FIG. 6), would be closed.

In operation, the cover means 22 would be as illustrated in FIG. 3 and the impeller 20 of the auxiliary blower 16 would serve to supplement the movement of grass clippings and other vegetation from the mower deck 12 to the collector 14. When the duct 18 or blower 16 clogs, the operator would dismount, the seat kill switch automatically shutting down the tractor 10, mower 12 and blower 16.

Figure 4:
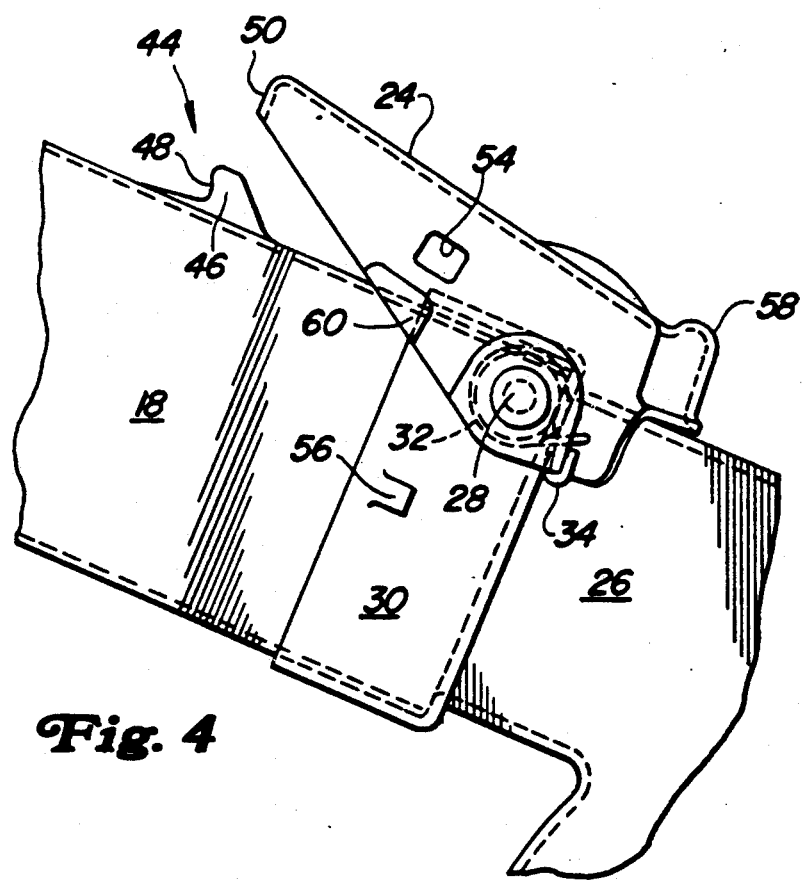
FIG. 4 is a view similar to FIG. 3, however the cover is disengaged from the conveyor duct section to permit uncoupling of the duct and blower.

To unclog the duct 18 or blower 16, the operator would press on the cover grip or handle 58 to swing it to the position illustrated in FIG. 4, thus releasing the overhanging lip 50 of the cover 24 from the protruding knob 46 of the second duct section 18. The inclined surfaces which facilitate locking of the two parts slide over each other as the plastic cover 24 flexes when lifted. The conveying duct section 18 could then be slipped out of the sleeve 30 and the cover 24 would be allowed to swing into place as shown in FIG. 5. As it reaches the position illustrated in FIG. 5, the recesses 54 slip over the ramps 56 to latch the cover 24 in its closed position.

When the operator later wants to raise the cover 24 to check for clogging material or reconnect the ducts 18 and 26, he inserts his finger into the pockets 60 provided at its sides.

Once the duct 18 or blower 16 has been cleared, the operator would allow the cover 24 to close over the blower outlet 26. In the event that an operator would then remount and start the vehicle 10, mower 12 and blower 16 to assure that the clog is eliminated, the guard 24 remains looked in place over the blower duct 26. Any material or objects propelled by the blower paddle 20 would impact the guard 24 and be retained in the blower duct housing 16, thus preventing injury to the operator or bystanders.

Upon learning that the blower and conveyor ducts 26 and 18 are clear, the operator would again shut down the vehicle 10, mower 12 and blower 16, dismount, reconnect the ducts 18 and 26 by raising the guard 24, to the position illustrated in FIG. 4, insert the collector duct 18 into the sleeve 30, press the cover latching means 44 into place and securing the ducts 18 and 26 together for operation.

I claim:

1. Guard means usable with a vegetation mower adapted to be supported by a vehicle and a vegetation collection means carried by the vehicle, a discharge duct means extending between the mower and collection means, the duct means including first and second material conveying sections with mating portions and means for releasably joining the two sections together, and blower means carried within one section near its mating portion, the guard means including:
   cover means swingably connected to the one section and movable between a first position substantially blocking said section when the two sections are uncoupled, and
   a second position adjacent said sections so as to permit the mating portions of the first and second sections to be joined, and
   means yieldably urging the cover means toward its first position.

2. The invention defined in claim 1 wherein the guard means is composed of a plastic-type material.

3. The invention defined in claim 1 wherein the cover means includes a spring biased door carried at the upper portion of the one section for swinging movement about a laterally extending axis.

4. The invention defined in claim 1 wherein a first latching means is provided between the cover means and the second section for releasably securing the mating portions of the first and second sections in their joined positions.

5. The invention defined in claim 4 wherein the first latching means includes first and second mating surfaces carried respectively by the cover means and the second section, one surface including an abuttable portion biased towards the other surface when engaged.

6. The invention defined in claim 5 wherein the cover means and the second section are composed of plastic-type materials.

7. The invention defined in claim 5 wherein the other surface is carried on a knob protruding from the second section and the one surface is carried on a lip projecting from the cover means.

8. The invention defined in claim 4 wherein a second latching means is provided between the cover means and the one section for releasably securing the cover means in its first position wherein it covers the hollow in said one section.

9. The invention defined in claim 8 wherein the second latching means includes a ramp and a ramp recess carried between the cover means and the one section, the recess being biased toward engagement with the ramp as the cover means is moved into its first position.

10. The invention defined in claim 1 wherein the cover means includes pocket means spaced from the connection for swinging the cover means against the means urging the cover means towards its first position.

11. The invention defined in claim 1 wherein handle means is provided on the cover means near its upper portion.

* * * * *